March 28, 1967  D. M. MAKOW  3,311,738
ANALOGUE SPHERICAL TRIANGLE COMPUTER
Filed June 28, 1963
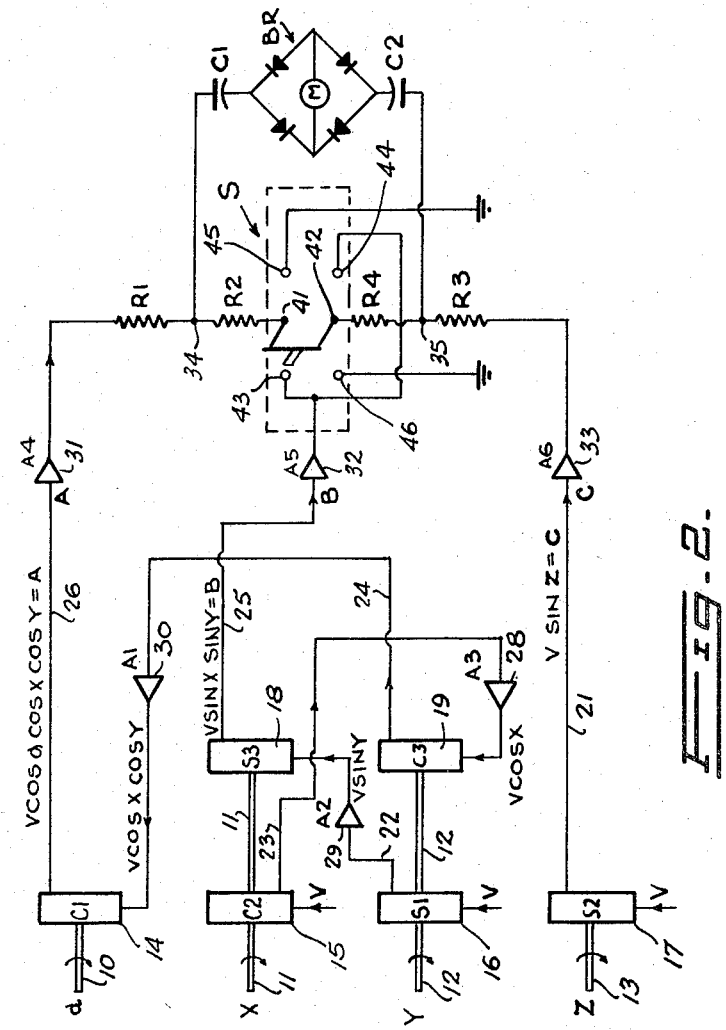
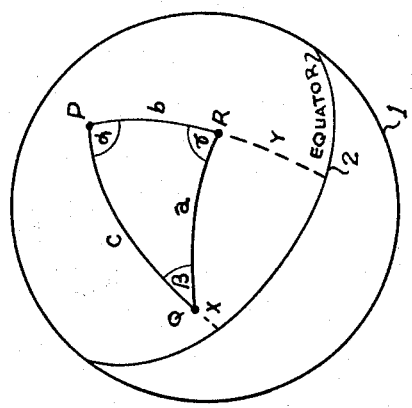
INVENTOR
DAVID M. MAKOW
BY *James R. Hughes*
PATENT AGENT

United States Patent Office 3,311,738
Patented Mar. 28, 1967

3,311,738
ANALOGUE SPHERICAL TRIANGLE COMPUTER
David M. Makow, Ottawa, Ontario, Canada, assignor to National Research Council, Ottawa, Ontario, Canada, a corporation of Canada
Filed June 28, 1963, Ser. No. 291,429
Claims priority, application Canada, July 18, 1962, 854,015, Patent 696,168
4 Claims. (Cl. 235—150.271)

This invention relates to a computer for solving spherical triangles and more particularly to a navigational computer that will compute the hour angle (relative longitude) of a ship or other craft from position measurements of a celestial body and, if the position of the craft is known, the course and great circle distance to a destination.

The two problems indicated above are common in marine navigation and are normally solved by calculating the spherical triangle equations with the help of haversine tables. This method requires the nevigator to carry out long and detailed computations and it is common practice on board ship to have one officer check another officer's calculations to avoid errors.

It is therefore an object of the present invention to provide an analogue computer that will solve the two navigational problems outlined above quickly and automatically and with little or no chance of error on the part of the operator.

Another object of the invention is to provide a computer that is light, compact, and if need be, portable.

Another object of the invention is to provide a computer that will solve a spherical triangle equation with an accuracy of less than ±10 minutes of arc.

These and other objects of the invention are achieved by providing an analogue computer that will solve the following general equation of a spherical triangle known as the law of cosines:

$$\cos \alpha = \frac{\cos a - \cos b \cos c}{\sin b \sin c} \quad (1)$$

In navigational work the spherical triangle is on the surface of the earth with the apex of the triangle at the pole. The other two points of the triangle are either the position of the celestial body and the position of the craft or the position of the craft and the destination point. In the first of these cases i.e. where the spherical triangle is formed by the pole, the position of the celestial body, and the position of the craft, the parameters of the identity given above become:

$\alpha$=hour angle
$a$=zenith distance
$b$=co-latitude of the craft
$c$=polar distance of the celestial body Since the parameters $a$, $b$, and $c$ are not directly obtainable from position measurements of the celestial body, it is advantageous to work with their complements which are directly obtainable, that is the angle $z$ to the sun, the latitude $y$ of the craft, and the latitude $x$ of the celestial body. Substituting $a=90-z$, $b=90-y$, and $c=90-x$, Equation 1 becomes:

$$\cos \alpha = \frac{\sin z - \sin x \sin y}{\cos x \cos y} \quad (2)$$

and rearranging, $$\cos \alpha \cos x \cos y = \sin z - \sin x \sin y \quad (3)$$

It can be seen that Equation 3 has the general form:

$$A = C - B$$

where $A=\cos \alpha \cos x \cos y$, $B=\sin x \sin y$, and $C=\sin z$. This is a three term equation where each term is made up of trigonometric functions or the product of trigonometric functions of triangle parameters.

The analogue computer according to the invention solves Equation 3 and comprises four inputs which correspond to the four parameters of the spherical triangle, sine and cosine potentiometers to give voltage analogues of the three terms of the equation, algebraic summing means, and means to indicate when the sum is zero thus showing balance of the equation.

In drawings which illustrate embodiments of the invention:

FIGURE 1 represents a spherical triangle drawn on the surface of the earth and explains the navigational theory underlying the invention, FIGURE 2 is a circuit diagram of a preferred form of analogue computer according to the invention.

Referring to FIGURE 1, a sphere 1 representing the earth has a spherical triangle PQR drawn on its surface. The apex of the triangle is at the north pole P. Point Q represents the position of a celestial body and point R represents the position of the ship, aircraft, exploration party, etc. The angle $\alpha$ is the hour angle (relative longitude) between the celestial body and the point R. The side $a$ of triangle PQR is the great circle distance between point Q and point R. In spherical trigonometry $a$ is normally given in terms of angle i.e., the angle subtended at the centre of the sphere by the two points Q and R. In navigational terms $a$ is the zenith distance i.e. the distance between Q and R on the great circle which can be expressed as an angle. As the angle $z$ to the celestial body which is the complement of $a$ is directly measured, it is used in preference to $a$. Side $b$ of the triangle is the co-latitude of point R but it is more convenient to work with the latitude $y$ which is measured from the equator 2. Side $c$ is the polar distance of the celestial body but again it is more convenient to work with its complement $x$, the latitude of the celestial body measured from the equator.

A similar triangle to that shown in FIGURE 1 can be drawn for the case where point Q is the position of the craft and point R is the destination. The course to steer $\beta$ and the great circle distance $a$ can be solved by the computer to be more fully described below.

Referring now to FIGURE 2 which is the circuit diagram for the analogue computer, input shafts 10, 11, 12, and 13 are connected to cosine potentiometers 14 and 15 and sine potentiometers 16 and 17 respectively. These input shafts are connected to calibrated setting dials placed on the exterior of the instrument for setting the parameters $\alpha$, $x$, $y$, and $z$ of Equation 3. In a convenient form of the instrument where the potentiometers used were 9-turn devices, 100 division dials were used. As 1 turn equals 10° or 600′, each division equals 6′ of arc. If vernier means are used the dials can be set to 1′ of arc.

A standard voltage V is applied to each of potentiometers 15, 16, and 17. If this voltage is supplied from a common source, there would be no particular need for voltage regulation because of the balance of the equation wherein the voltage V appears on both sides and therefore cancels. In a typical case the voltage used was 27 volts, 60 cycles. These values could vary quite widely however and D.C. could be used although A.C. has been found preferable as D.C. drifts that might be engendered in the amplifiers in the circuit can be eliminated by blocking capacitors.

Input shaft 11 is also connetced to a sine potentiometer 18 and input shaft 12 is also connected to a cosine potentiometer 19. The output of sine potentiometer 17 is a voltage whose magnitude is equal to $V \sin z = C$ and is applied via line 21 to unity voltage gain operational amplifier 33. The output of sine potentiometer 16 which is $V \sin y$ is applied via line 22 to sine potentiometer 18 through a unity gain buffer amplifier 29. This amplifier has a high input impedance and a low output impedance and is used to prevent loading of one potentiometer by the output of another. The output from cosine potentiometer 15 which is $V \cos x$ is applied via line 23 through amplifier 28 to cosine potentiometer 19. The output of sine potentiometer 18 which is $V \sin x \sin y = B$ is applied through line 25 to operational amplifier 32. The output of cosine potentiometer 19 which $V \cos x \cos y$ is applied via line 24 through buffer amplifier 30 to cosine potentiometer 14. The output of cosine potentiometer 14 which is $V \cos \alpha \cos x \cos y = A$ is applied via line 26 to operational amplifier 31.

The output of unity voltage gain amplifier 31 is applied via two equal resistors R1 and R2 in series to terminal 41 of a double pole double throw switch S. Similarly the output of amplifier 33 is applied via two equal resistors R3 and R4 to terminal 42. Typical values for resistors R1, R2, R3 and R4 would be 15K. Preferably these resistors should be similar in all characteristics e.g. type, temperature drift, etc. The output of amplifier 32 is connected to terminals 43 and 44 of switch S. Terminals 45 and 46 are grounded.

Midpoint 34 between R1 and R2 and midpoint 35 between R3 and R4 are connected through blocking capacitors C1 and C2 to a rectifier bridge BR having a meter M to indicate balance.

Switch S is necessary to accommodate for the two cases (1) where the celestial body and the craft are on the same side of the equator and (2) where they are in different sides. In the first case $\sin x \sin y$ is positive and Equation 3 (general form $A+B=C$) is to be solved. With switch S in the left-hand position the voltage at point 34 is $$\frac{A+B}{2}$$

and the voltage at point 35 is $C/2$. With a null reading on meter M indicating that the voltage at point 34 and 35 are equal, it can be seen that the necessary condition of $A+B=C$ is met. In the second case $\sin x \sin y$ is negative and Equation 3 becomes:

$$\cos \alpha \cos x \cos y = \sin z + \sin x \sin y \quad (5)$$

or in general form:
$$A = B + C \quad (6)$$

In this case switch S is flipped to the right-hand position. With a null on meter M it can be seen that the conditions for the solution of Equation 6 are met.

Operation of the computer is simple and straight forward. To find the hour angle $\alpha$ (relative longitude), the values of $x$, $y$, and $z$ which are obtain from position measusements of the celestial body are set on the appropriate dials. With switch S in the appropriate position as explained above, the dial controlling the value of $\alpha$ is turned until a null-reading is obtained on meter M. At this point Equation 3 or 5 is solved and the value of $\alpha$ can be read directly off the dial.

Once the hour angle $\alpha$ has been obtained, it is possible to obtain the great circle distance $a=(90-z)$ and the course to steer to a destination. For these computations it is assumed that the craft is at point Q of FIGURE 1 and the destination at point R. The parameter $x$ is now the latitude of the ship, $y$ the latitude of the distination, and $\alpha$ the difference of their longitudes. With $\alpha$, $x$, and $y$ set, the computer is balanced to obtain $z$ which is the complement of $a$ the required great circle distance. Since $a$, $b$, and $c$ are now known the course $\beta$ can be found in similar fashion to $\alpha$.

This computer, in addition to solving the equations given above, can solve right spherical triangles. In one case $\alpha = 90°$ and certain of the spherical triangle equations simplify to a two term equation i.e., of the general form $B=C$ which is a relation between the three sides of the right spherical triangle, and if two parameters are known, a third can be solved for. This would be done by setting $\alpha = 90°$, inserting the values of two of the other three parameters and solving for the third. This capability of the computer is of importance in solving several navigational problems. An example would be where the craft is close to the destination. At small angles, cosine $\alpha$ varies slowly with variation of $\alpha$ and therefore it is difficult to obtain reliable results using $\alpha$. It is preferable in this case to set up a right spherical triangle with known values and solve the right triangle as outlined above.

In another example of a right spherical triangle equation that can be solved for, the general Equation 1:

$$\cos \alpha = \frac{\cos a \pm \cos b \cos c}{\sin b \sin c}$$

by puting $a = 90°$ simplifies to:

$$\cos \alpha = \pm \cot b \cot c \quad (5)$$
$$\pm \tan (90-b) \cot c \quad (6)$$

It can be seen that Equation 6 is a right spherical triangle in which the relationship of the equation is between one angle and two sides. In many cases this might be a convenient equation to work with.

In the above description, a preferred embodiment of the invention has been described but it should be pointed out that many many modifications could be made without going beyond the scope of the invention. For example, potentiometers that give both sine and cosine functions are available and could be used in place of potentiometers 15, 18, 16 and 19. In place of the three amplifiers 31, 32, and 33, a single algebraically summing operational amplifier could be used. Switch means S could be replaced by a reversing switch in lines 21 and 25. The bridge and meter circuit could be replaced by other devices capable of indicating equality of the voltage levels at the two midpoints 34 and 35. Other modifications would suggest themselves to those skilled in the electronic art.

What is claimed is:

1. An analogue computer for solving a spherical triangle equation of the form $$\cos \alpha \cos x \cos y = \pm \sin x \sin y + \sin z$$

where $\alpha$, $x$, $y$, and $z$ are parameters of said equation comprising:
   (a) four rotatable shafts whose angular displacements correspond to values of said four parameters,
   (b) a first and second cosine potentiometer connected to the shafts, corresponding to the values of $\alpha$ and $x$ respectively,
   (c) a first and second sine potentiometer connected to the shafts corresponding to the values of $y$ and $z$ respectively,
   (d) equal voltages applied to each of said potentiometers,
   (e) a third cosine potentiometer connected to the shaft corresponding to the value of $y$,
   (f) a third sine potentiometer connected to the shaft corresponding to the value of $x$,
   (g) a connection from the output of said second cosine potentiometer to input of said third cosine potentiometer,
   (h) a connection from the output of said first sine potentiometer to input of said third sine potentiometer,
   (i) a connection from the output of said third cosine potentiometer to the input of said first cosine potentiometer,
   (j) a first and second resistor, said resistors having equal resistance, connected in series between the output of said first cosine potentiometer and the output of said third sine potentiometer
   (k) a third and fourth resistor, said resistors having equal resistance, connected in series between the output of said second sine potentiometer and ground, (1) voltage comparison means connected between the common point of said first and second resistor and common point of said third and fourth resistor, (m) indicator means to indicate equality voltage at said common points.

2. An analogue computer as in claim 1 in which the output connections of all potentiometers include unity voltage gain buffer amplifiers.

3. An analogue computer as in claim 1 in which the output connections of said second and third sine potentiometers include a reversing switch such that at one position of the switch the positive form of said spherical triangle equation is solved and at the other position of the switch the negative form of the equation is solved.

4. An analogue computer as in claim 1 in which the said equal voltages are A.C. and in which the voltage comparison means is a rectifier bridge connected through blocking capacitors to said common points.

References Cited by the Examiner
UNITED STATES PATENTS

| 2,688,442 | 9/1954 | Droz et al. | 235—192 |
| 2,965,299 | 12/1960 | Gordon | 235—186 |

MALCOLM A. MORRISON, *Primary Examiner.*

A. J. SARLI, J. F. RUGGIERO, *Assistant Examiners.*